United States Patent [19]
Gilstrap, Jr.

[11] 3,964,051
[45] June 15, 1976

[54] ELECTROSTATIC COMMUNICATION SYSTEM
[75] Inventor: Lewey O. Gilstrap, Jr., Washington, D.C.
[73] Assignee: Infodyne, Inc., Arlington, Va.
[22] Filed: June 6, 1974
[21] Appl. No.: 476,887

Related U.S. Application Data
[63] Continuation-in-part of Ser. No. 331,567, Feb. 12, 1973, abandoned.

[52] U.S. Cl. ............... 340/4 A; 343/719; 179/111 R; 325/28; 343/908
[51] Int. Cl.² ........................... H04B 13/00
[58] Field of Search ............ 340/4 R, 4 A; 343/719, 343/898, 908; 325/26, 28, 318, 319, 373, 374; 179/1 HR; 317/242, 244, 246

[56] References Cited
UNITED STATES PATENTS
| | | | |
|---|---|---|---|
| 1,654,108 | 12/1927 | Blanc | 343/898 |
| 2,372,228 | 3/1945 | Schelkunoff | 325/26 |
| 3,208,037 | 9/1965 | Botwin | 317/246 |
| 3,265,972 | 8/1966 | Curry | 325/28 |
| 3,307,108 | 2/1967 | Induni | 343/898 |

OTHER PUBLICATIONS
Popovic, et al., "Nikola Tesla 1856–1943", 1956, pp. L–121 to L–125 and A–153 to A–161 and A–127, Published in Beograd, Yugoslavia, TK7/T4.

Primary Examiner—Nelson Moskowitz
Attorney, Agent, or Firm—Lane, Aitken, Dunner & Ziems

[57] ABSTRACT

A pair of concentric conducting spheres separated by a dielectric layer form a monopole radiator which serves as an antenna for electrostatic waves. Corresponding signal voltages of opposite polarity are placed on the two spheres. At the receiver, variations in the electric field are converted to a correspondingly varying voltage which is demodulated in a coherent or synchronous detector to increase the signal-to-noise ratio.

6 Claims, 3 Drawing Figures

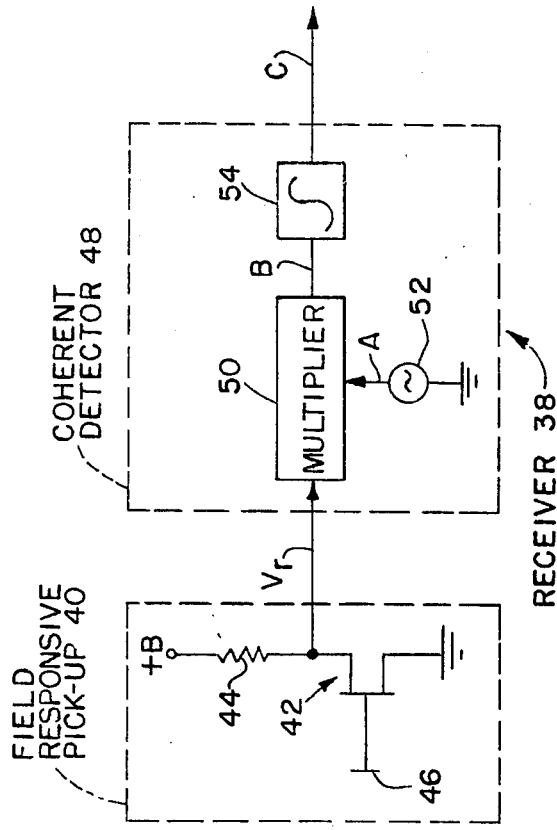
FIG. 3.
FIG. 1.
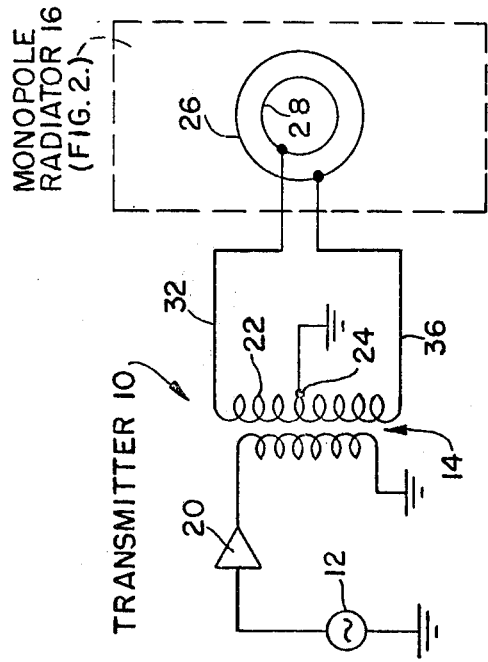
FIG. 2.

ELECTROSTATIC COMMUNICATION SYSTEM

CROSS-REFERENCE TO RELATED APPLICATIONS

This is a continuation-in-part application of my co-pending application Ser. No. 331,567, filed Feb. 12, 1973, now abandoned.

BACKGROUND OF THE INVENTION

The invention relates generally to electrostatic transmission and reception, and more particularly, to underwater electrostatic communication systems.

In the past, five basic systems have been investigated for underwater communication: acoustic, magnetic, laser, electromagnetic and electrostatic or capacitive systems. All of these systems have serious drawbacks, the most significant being a lack of range which precludes their use in distant submarine-to-submarine or submarine-to-shore communication. In particular, it has been found that electromagnetic fields of very high power levels operating at the lower end of the frequency spectrum are a suitable means of submarine communication. However, various considerations restrict their use to relatively short ranges.

SUMMARY OF THE INVENTION

Underwater communication can be accomplished using longitudinal electrostatic or capacative waves, also called scalar or polarization waves because of their relationship to the Maxwell wave equations. The general purpose of the invention is to improve underwater communication systems based on such electrostatic wave propagation. In particular, the invention is directed to improvements in elecctrostatic antennas and detection systems. In accordance with the present invention, the transmitting antenna is spherical and electrostatic transmission is achieved by applying a varying signal voltage to the spherical antenna which is submerged under water. More specifically, the antenna comprises a pair of concentric conducting spheres separated by a dielectric layer form a monopole radiator which serves as an antenna for electrostatic waves in water. An insulating coating is provided around the outer sphere to electrically insulate the sphere from the water in which it is submerged. Opposite charges are applied to the two spheres by means of a transformer. The secondary winding of the transformer has a grounded center-tap, and the end leads of the secondary winding are connected respectively to the two spheres. An alternating voltage generated in the primary winding of the transformer is applied with a constant 180° phase difference, i.e., with opposite polarity, to the two conducting spheres. The electric field associated with the voltage developed on the outer sphere is propagated throughout the medium.

In addition, an improved system for electrostatic wave detection or demodulation is presented. A field responsive pickup is provided by a field effect transistor (FET) having its gate electrode connected to a conducting plate or sphere. The FET converts the electrostatic field to a voltage which is applied to a coherent or synchronous detector, sometimes referred to as double-sideband reception. In the detector the received signal is multiplied by an internally generated signal having the same frequency as the carrier wave. The product is integrated or passed through a low pass filter to recover the information portion of the transmitted signal.

BRIEF DESCRIPTION OF THE DRAWINGS

FIG. 1 is a schematic diagram of an electrostatic wave transmitter system according to the invention.

FIG. 2 is a fragmentary view of the monopole radiator of FIG. 1 according to the invention.

FIG. 3 is a schematic and block diagram of an electrostatic wave receiver system according to the invention.

DESCRIPTION OF THE PREFERRED EMBODIMENT

FIG. 1 illustrates an underwater electrostatic wave transmitter 10. A signal generator 12 is coupled via amplifier 20 and a step-up transformer 14 to a monopole radiator 16 according to the invention. One end of the primary winding 18 of the transformer 14 has a grounded center-tap 24 dividing the secondary winding 22 into two sides of opposite phase.

As shown in FIG. 2, the monopole radiator 16 includes a pair of concentric electrically conductive spheres 26 and 28 separated by a dielectric layer 30. One end of the secondary winding 22 (FIG. 1) is connected by means of a conductor 32 to the inner sphere 28 through an insulated opening 34 (FIG. 2) in the outer sphere 26. The other end of the secondary winding 22 is connected by means of a conductor 36 to the outer sphere 26 of the monopole radiator 16. The conductors 32 and 34 are provided with waterproof insulation and an insulating coating 37 is provided on the sphere 26.

An alternating voltage generated by the signal generator 12 is applied through the transformer 14 to the monopole radiator 16 such that at any point in time the voltages applied to the two spheres 26 and 28 will be equal in magnitude but opposite in polarity, i.e., 180° out of phase. The outer sphere 26 then appears as an ideal monopole radiator to the external dielectric medium, in this case water. The charge placed on the outer sphere develops a surface voltage which stresses the dielectric (water) in which the sphere resides, and when the voltage and thereby the charge on the sphere 26 is changed in accordance with the signal to be transmitted, electrostatic or scalar potential waves will be generated which will transmit the signal through the medium.

As shown in FIG. 3, the propagated field is received by a receiver 38. The receiver 38 includes a field responsive pickup 40 employing an FET 42 to convert the received field intensity to a voltage, $V_r$. The source electrode of the FET 42 is tied to a reference voltage via a resistor 44. The reference voltage is fixed or constant with respect to the dielectric field. The reference voltage should remain constant with respect to the electrical neutrality of the system. The drain of the FET 42 is grounded and the FET gate is connected to a conducting plate 46 or sphere (not shown). The current flow from the source to the drain of the FET 42 is controlled in accordance with variations in the sensed electric field. A voltage $V_r$ representing the instantaneous amplitude of the field is tapped off of the source electrode of the FET 42 and applied to a coherent detector 48.

In the detector 48, the voltage $V_r$ is multiplied in a multiplier 50 by a voltage A produced by a signal generator 52 or local oscillator replicating the carrier wave transmitted by the monopole radiator 16 in the transmitter 10. The output of the multiplier 50, the product voltage B, is applied to an integrator 54 or low pass filter which integrates the product B continously over a number of periods of the carrier wave to produce the demodulated output C.

It is necessary that both the frequency and phase of the signal A be synchronized with that of the carrier wave. Synchronization maintenance can be performed by means of a phase lock loop (not shown) which tracks the carrier wave and corrects for local oscillator drift.

The coherent detector 48 increases the range at which the electric field propagated by the transmitter 10 can be detected. The effectiveness of the coherent detector 48 in detecting very weak signals is illustrated for unmodulated sine wave detection in the following disucussion. Let $V_t = \sin \omega t$ be the transmitted signal, where $\omega$ is angular frequency and $t$ is time. The received signal can be represented as $V_r = k \sin \omega t + S(t)$, where $K \ll 1$ and $S(t)$ is background noise.

In the coherent detector 48, the received signal, $V_r$, is multiplied by the signal $A = \sin \omega t$ to generate the product.

$$B = V_r A = [K \sin \omega t + S(t)] \sin \omega t. \quad (1)$$

The integrator or low pass filter 54 can be represented theoretically by the mathematical model of integration over a number, $n$, of whole periods, $T = (2\pi)/\omega$, at the angular frequency $\omega$. Thus the output of the integrator 54 may be approximated by the expression:

$$\int_o^{nT} [K \sin^2\omega t + S(t)] \sin \omega t \, dt \quad (2)$$

$$= \int_o^{nT} K \sin^2\omega t \, dt + \int_o^{nT} S(t) \sin \omega t \, dt \quad (3)$$

$$= \frac{n}{2} K + \int_o^{nT} S(t) \sin \omega t \, dt \quad (4)$$

It may be assumed that $$\lim_{n \to \infty} \int_o^{nT} S(t) \sin \omega t \, dt = o \quad (5)$$

Thus, in expression (4) above the noise portion (right-hand term) tends toward zero, while the signal portion is proportional to the length of time over which the integration is performed. Accordingly this coherent detection process is equivalent to amplifying the signal by the factor $n/2$ while the noise component remains unchanged or reduced. The signal to noise ratio is the enhanced and detection can take place at a much greater range.

The coherent detection process changes the allowable band width for modulation. For example, modulating the carrier wave at a frequency having a period much less than the product nT would result in a significant loss of information in the receiver. Information is lost because the integrator acts as a low pass filter tending to screen out frequencies above a predetermined value. Thus the modulating frequency must be lowered or the carrier frequency increased in order to increase the period of the modulating signal at least to the level nT. A convenient way to charactierize the coherent detector is by the ratio, $R_b = n$, of bandwidths before and after integration.

The improved range achieved by use of the coherent detector 48 with a monopole radiator 16 as a transmitting antenna may be estimated as follows:

From Coulomb's Law the field intensity produced by a charged sphere in free space is:

$$E = - \frac{q}{4\pi\epsilon_o R^2} \quad (6)$$

where R is the distance from the center of the sphere, and $$\frac{E_R}{E_1} = \frac{-\frac{q}{4\pi\epsilon_o R^2}}{-\frac{q}{4\pi\epsilon_o 1^2}} = \frac{1}{R^2} \quad (7)$$

where $E_1$, represents the field intensity measured at unit distance. Thus $$E_R = \frac{E_1}{R^2} \quad (8)$$

Let the minimum detectable field be $E_{min}$. Then the maximum range at which a field can be detected is $$R_m = \sqrt{E_1/E_{min}} \quad (9)$$

If a field effect transistor is used to convert $E$ to a voltage and if coherent detection is used, then:

$$R_m = \sqrt{V_1 r_b/V_{min}} \quad (10)$$

Thus the maximum range in kilometers at which a signal can be coherently detected is given by the equation $$R_m = \alpha \sqrt{V_1 r_b / V_{min}} \times 10^{-3} \quad (11)$$

where $V_1$ is the FET output measured one meter from the center of the radiating monopole, $V_{min}$ is the threshold of sensitivity of the receiver, $\alpha$ is the attenuation of the signal due to energy absorption by the medium, and $r_b$ is the ratio of band widths of the signal before and after integration in the coherent detector 48. Thus, the maximum range of the system is improved by the factor $\sqrt{r_b}$.

The invention may be embodied in other specific forms without departing from its spirit or essential characteristics. For example, instead of a single monopole radiator 16 an array of a plurality of radiators 16 can be used. Besides the step-up transformer 14 shown in FIG. 1, it is possible to use other means for applying 180° out-of-phase signals to the conducting spheres 26 and 28. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

I claim:

1. An underwater electrostatic wave antenna, comprising a monopole radiator including a pair of concentric electrically conductive spheres, a dielectric material separating said spheres, means on said outer sphere to insulate said sphere from water when submerged in water, and means for applying varying voltages of opposite polarity to said spheres respectively.

2. The antenna system of claim 1, wherein said voltage applying means includes a pair of electrical conductors one of which is electrically connected to the outer sphere, the other conductor being electrically connected to the inner sphere through an insulated opening in said outer sphere.

3. The antenna system of claim 2, wherein said voltage applying means further includes means to generate an alternating voltage signal, and transducing means responsive to said alternating voltage signal for producing corresponding signals on said conductors respectively 180° out-of-phase with each other.

4. The antenna system of claim 3, wherein said transducing means includes a transformer having a primary winding connected to receive said alternating voltage signal and a secondary winding center-tapped at a reference potential, opposite ends of said secondary winding being connected respectively to said conductors.

5. An underwater electrostatic antenna, comprising a pair of concentric electrically conductive spheres, a dielectric material between said spheres for insulation, and means for applying corresponding voltages of opposite polarity to said spheres respectively.

6. A method of transmitting a signal underwater comprising providing an electrically conducting sphere, providing a waterproof insulating cover on said sphere, submerging said sphere with said cover underwater, applying an alternating signal potential to said sphere to generate a varying electrostatic field underwater radiating from said sphere as a monopole, and detecting variations in said electrostatic field radiating from said sphere, said detecting of the variations in said electrostatic field being carried out underwater.

* * * * *